US012756769B2

(12) United States Patent
Chauhan et al.

(10) Patent No.: US 12,756,769 B2
(45) Date of Patent: Oct. 6, 2026

(54) SYSTEMS AND METHODS FOR DYNAMIC NETWORK ROUTING DURING MICROSERVICE ORCHESTRATION

(71) Applicant: Capital One Services, LLC, McLean, VA (US)

(72) Inventors: Ayushi Chauhan, North Brunswick, NJ (US); KanakaRavali Perisetla, Glendale, AZ (US); Amrit Khadka, Henrico, VA (US); Mukthi Kamalapuri, Glen Allen, VA (US); Anirudh Molala, Glen Allen, VA (US); Nicholas Figgins, Washington, DC (US); Michael A. Taylor, Midlothian, VA (US)

(73) Assignee: Capital One Services, LLC, McLean, VA (US)

( * ) Notice: Subject to any disclaimer, the term of this patent is extended or adjusted under 35 U.S.C. 154(b) by 59 days.

(21) Appl. No.: 19/034,437

(22) Filed: Jan. 22, 2025

(65) Prior Publication Data

US 2026/0214150 A1 Jul. 23, 2026

(51) Int. Cl.

*G06F 15/173* (2006.01)
*G06F 8/41* (2018.01)
*H04L 45/74* (2022.01)
*H04L 67/10* (2022.01)
*H04L 67/63* (2022.01)

(52) U.S. Cl.

CPC .............. *H04L 67/63* (2022.05); *G06F 8/433* (2013.01); *H04L 45/74* (2013.01); *H04L 67/10* (2013.01)

(58) Field of Classification Search

CPC ......... H04L 67/63; H04L 67/10; H04L 45/74; G06F 8/433

See application file for complete search history.

(56) References Cited

U.S. PATENT DOCUMENTS 12,455,774 B1 * 10/2025 Stolte ...................... G06F 9/505
2025/0110702 A1 * 4/2025 Xiao ....................... G06F 8/427
2026/0056954 A1 * 2/2026 Nair ................. G06F 16/24552

* cited by examiner

*Primary Examiner* — Joseph R Maniwang
(74) *Attorney, Agent, or Firm* — Foley & Lardner LLP

(57) ABSTRACT

Systems and methods provide request-driven workflow creation. For example, while conventional orchestrators rely on pre-authored step-by-step workflows, the systems and methods dynamically compose a workflow at runtime based on the incoming request. That is, the system's configurations only rely on the immediate input nodes without needing to define the entire dependency tree. By doing so, the system and methods mitigate the consistency, latency, and fault tolerance issues.

20 Claims, 5 Drawing Sheets

250

270

400

SYSTEMS AND METHODS FOR DYNAMIC NETWORK ROUTING DURING MICROSERVICE ORCHESTRATION

BACKGROUND

Computer networks use microservices to enhance flexibility, scalability, and resilience in managing various networking tasks and services. Microservices architecture breaks down monolithic applications into small, independent services that can be developed, deployed, and managed separately, making it ideal for complex networking systems that require efficient management of resources, services, and data flows.

Microservice orchestration is the process of coordinating and managing the interactions between multiple microservices in a distributed system to achieve a specific goal. In a microservices architecture, different services often need to communicate and collaborate to fulfill complex business processes. Orchestration ensures that these interactions happen in a defined sequence, managing dependencies, failures, retries, and states. This can be achieved through a central orchestrator, which directs the flow of events, or a dedicated orchestration tool. The orchestrator takes responsibility for ensuring that each microservice executes its task in the right order and handles any errors or exceptions that may occur during the process. By automating and managing these workflows, orchestration simplifies the management of microservices, making it easier to scale, maintain, and ensure reliability in large systems.

SUMMARY

Systems and methods are described herein for novel uses and/or improvements to microservice orchestration. For example, microservice orchestration introduces several technical challenges that can complicate system design and management. One key issue is managing distributed state, as microservices often have to share or rely on data from other services, leading to complexities in consistency, synchronization, and fault tolerance. This can make tracking the state of workflows difficult, especially when services fail or restart unexpectedly. Additionally, orchestrating services across different environments can introduce latency and performance bottlenecks due to the overhead of network communication. Handling service failures gracefully is another challenge, as orchestration must ensure retries, compensation actions, or alternative workflows are triggered when something goes wrong. Scaling orchestration effectively is also non-trivial, as it requires balancing loads across services and ensuring that bottlenecks in one service do not cascade to others. Security is another concern, as orchestrators need to manage authentication, authorization, and secure communication between services. Lastly, managing versioning and updates in a constantly evolving system can lead to compatibility issues, where different microservices might be updated at different times, resulting in coordination and testing challenges.

To overcome and mitigate these technical challenges, the system and methods disclosed herein provide request-driven workflow creation. For example, while the conventional orchestrators rely on pre-authored step-by-step workflows, the systems and methods described herein dynamically compose a workflow at runtime based on the incoming request. That is, the system's configurations only rely on the immediate input nodes without needing to define the entire dependency tree. By doing so, the system and methods mitigate the consistency, latency, and fault tolerance issues described above.

However, dynamically composing a workflow at runtime based on the incoming request without defining the entire dependency tree does cause a novel technical problem. Namely, Since the system dynamically determines the workflow at runtime, it has to resolve service dependencies and orchestrate service calls on the fly, which may introduce delays compared to predefined workflows that are optimized and executed with minimal overhead. This real-time decision-making can also result in higher computation costs. To overcome this novel technical problem, the system and methods may determine a second microservice orchestration workflow process (e.g., a dynamically determined workflow) based on the inputs and outputs of a current node in a first microservice orchestration workflow process, not based on the overall output of the first microservice orchestration workflow process. By doing so, the complexity of the on-the-fly determinations is greatly reduced such that the system can make on-the-fly choices about which services to invoke and in what order in real time. Accordingly, the system may use context from an incoming request, system state, and/or predefined rules or artificial intelligence models to determine the appropriate workflow path for the next dynamically determined workflow node.

In some aspects, systems and methods for dynamic microservice orchestration are described. For example, the system may receive a first request for initiating a first microservice orchestration workflow process, wherein the first request comprises a workflow process input for the first microservice orchestration workflow process and a requested network process output for the first microservice orchestration workflow process. The system may determine a first network node of the first microservice orchestration workflow process corresponding to the workflow process input. The system may determine, based on the first network node, a first node input and a first node output. The system may determine, based on the first node input and the first node output, a first subset of nodes, wherein the first subset of nodes performs a second microservice orchestration workflow process. The system may determine a second network output based on the first subset of nodes. The system may determine, based on the second network output, a second network node of the first microservice orchestration workflow process.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
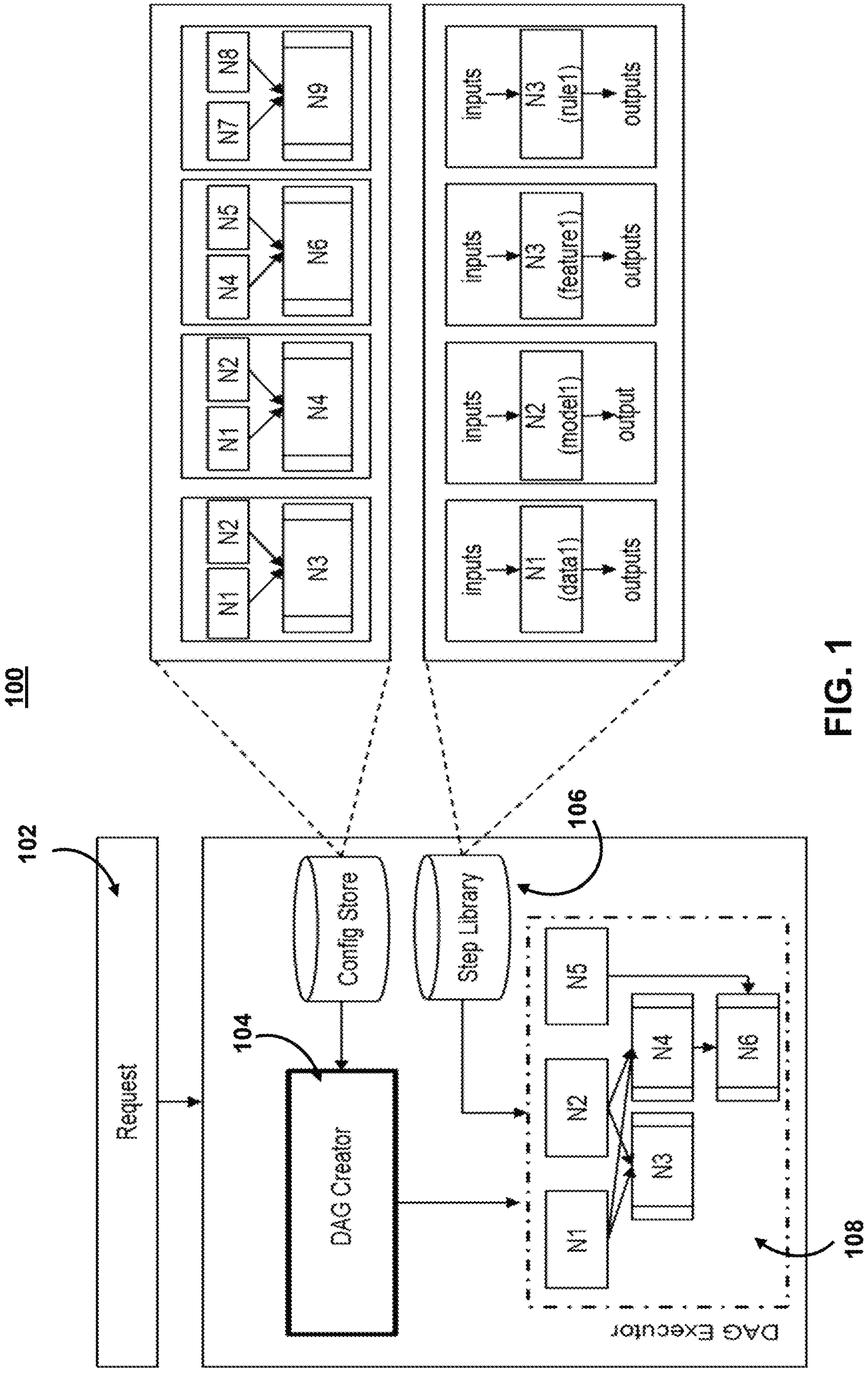
FIG. 1 shows an illustrative diagram for dynamic microservice orchestration, in accordance with one or more embodiments.

FIG. 1 shows an illustrative diagram for dynamic microservice orchestration, in accordance with one or more embodiments. As shown in FIG. 1, system 100 may comprise a workflow engine that dynamically generates and executes process flows in real-time based on a request (e.g., request 102). For example, the system may comprise a workflow engine that dynamically generates and executes process flows in real time based on a request by analyzing the input parameters and requirements specified in the request and then mapping them to predefined workflow templates, rules, or logic. Upon receiving the request, the engine evaluates the tasks, conditions, and dependencies that must be fulfilled to achieve the desired outcome. Using dynamic orchestration techniques, it selects and sequences appropriate microservices or tasks from a library of available components to form a tailored process flow that meets the specific needs of the request.

The workflow engine may leverage real-time decision-making algorithms, artificial intelligence, or rule-based systems to optimize the process flow as it is generated. It can adjust the sequence of tasks, identify parallelizable activities, and dynamically route data between nodes based on the current state of the system or environment. As the engine constructs the workflow, it takes into account any dependencies, error-handling protocols, and conditions that need to be addressed, ensuring that the process flow is robust and adaptable. Once the process flow is generated, the workflow engine immediately begins executing it, invoking microservices or tasks in the appropriate order. It monitors the execution in real time, adjusting the flow as necessary-such as pausing tasks that depend on others, handling errors, or rerouting workflows in response to changing conditions. This real-time execution allows the workflow engine to handle complex, multi-step processes efficiently while adapting to evolving requirements or environmental factors dynamically. This enables the system to meet the needs of highly variable requests with flexibility and precision.

System 100 may comprise a Dynamic Acyclic Graph (DAG) creator 104, executor 108, and step library 106. For example, system can use a Dynamic Acyclic Graph (DAG) creator, executor, and step library to dynamically compose workflows at runtime based on an incoming request by generating configurations that rely only on the immediate input nodes, without needing to predefine the entire dependency tree. When a request is received, the system uses the DAG creator to analyze the specific input and dynamically determine the necessary nodes (or steps) for that workflow. Instead of constructing a complex, predefined workflow upfront, the system builds the workflow in real time by focusing on immediate input nodes and the dependencies that are relevant at each step, allowing for a more flexible and efficient execution process.

This approach enables request-driven workflow (DAG) creation, where workflows are tailored on-the-fly to meet the exact requirements of the incoming request. The system pulls only the necessary data and executes only the required steps, optimizing the data flow and allowing concurrent execution of steps wherever possible. This eliminates the need for the explicit configuration of complex workflows, as the system automatically identifies which steps can run in parallel, thereby speeding up the entire process.

Additionally, the system leverages a no-code deployment capability for new orchestration flows, enabling users or operators to quickly design and deploy new workflows without writing custom code. This dramatically reduces the time-to-market for new processes or modifications to existing workflows. New workflows can be added to the step library and incorporated dynamically as needed, allowing the system to evolve and adapt without downtime.

The DAG-based workflow is executed optimally, ensuring that data is pulled only once, even if multiple steps need access to the same data. This eliminates the need for caching solutions and prevents redundant data fetching, reducing overall system load and latency. By focusing on the immediate input nodes and dynamically orchestrating workflows in real-time, the system streamlines execution, enhances efficiency, and allows for rapid, scalable deployment of new processes.

As shown in FIG. 1, system 100 receives request 102 to run process "N6." Based on a configuration, the system determines that to run N6 it needs to have process N4 and process N5. System 100 creates a node request for N6, and the DAG for N6 generates a node-specific DAG of N4 and N6. To generate the node-specific workflow it iterates through the dependencies until it finds none.

For example, when a system receives a request to run process N6, it begins by analyzing the dependencies required to execute that process. Based on the configuration, the system determines that in order to run N6, it must first execute N4 and N5. To manage this, the system creates a node request for N6 and uses the DAG creator, executor, and step library to dynamically generate the workflow at runtime.

The DAG creator builds the workflow by focusing on the immediate input nodes, without needing to predefine the entire dependency tree. In this case, the system starts with N6 and identifies that N4 and N5 are prerequisites. The system dynamically composes a DAG with N4 and N5 as input nodes for N6. Instead of constructing the entire dependency tree upfront, the system iterates through the dependencies of each node, dynamically checking what is required to proceed, allowing for an optimized and minimal configuration.

For each node in the workflow (such as N4), the system follows the same logic-iterating through its dependencies until it finds that there are no further dependencies to resolve. As a result, the system generates a workflow for N6 that includes a node-specific DAG involving the required processes, in this case, N4 and N5. The executor then runs the steps sequentially or concurrently, depending on the requirements and availability of resources.

By dynamically composing the workflow only with immediate input nodes, the system avoids the need for complex, predefined dependency trees. This approach allows the workflow for N6 to be generated efficiently at runtime, pulling data and executing processes as needed. The system also optimizes execution by ensuring that dependencies are resolved in the most efficient order, iterating through each node's requirements until all are satisfied, ensuring that the entire process runs smoothly without redundant configuration or processing.

Upon completion of the workflow, the system may generate a recommendation on a user interface. As referred to herein, a "user interface" may comprise a human-computer interaction and communication in a device, and may include display screens, keyboards, a mouse, and the appearance of a desktop. For example, a user interface may comprise a way a user interacts with an application or a website.

As referred to herein, "content" should be understood to mean an electronically consumable user asset, such as Internet content (e.g., streaming content, downloadable content, Webcasts, etc.), video clips, audio, content information, pictures, rotating images, documents, playlists, websites, articles, books, electronic books, blogs, advertisements, chat sessions, social media content, applications, games, and/or any other media or multimedia and/or combination of the same. Content may be recorded, played, displayed, or accessed by user devices, but can also be part of a live performance. Furthermore, user-generated content may include content created and/or consumed by a user. For example, user-generated content may include content created by another, but consumed and/or published by the user.

The system may monitor content generated by the user to generate user profile data. As referred to herein, "a user profile" and/or "user profile data" may comprise data actively and/or passively collected about a user. For example, the user profile data may comprise content generated by the user and a user characteristic for the user. A user profile may be content consumed and/or created by a user.

User profile data may also include a user characteristic. As referred to herein, "a user characteristic" may include information about a user and/or information included in a directory of stored user settings, preferences, and information for the user. For example, a user profile may have the settings for the user's installed programs and operating system. In some embodiments, the user profile may be a visual display of personal data associated with a specific user, or a customized desktop environment. In some embodiments, the user profile may be a digital representation of a person's identity. The data in the user profile may be generated based on the system actively or passively monitoring.

Figure 2A:
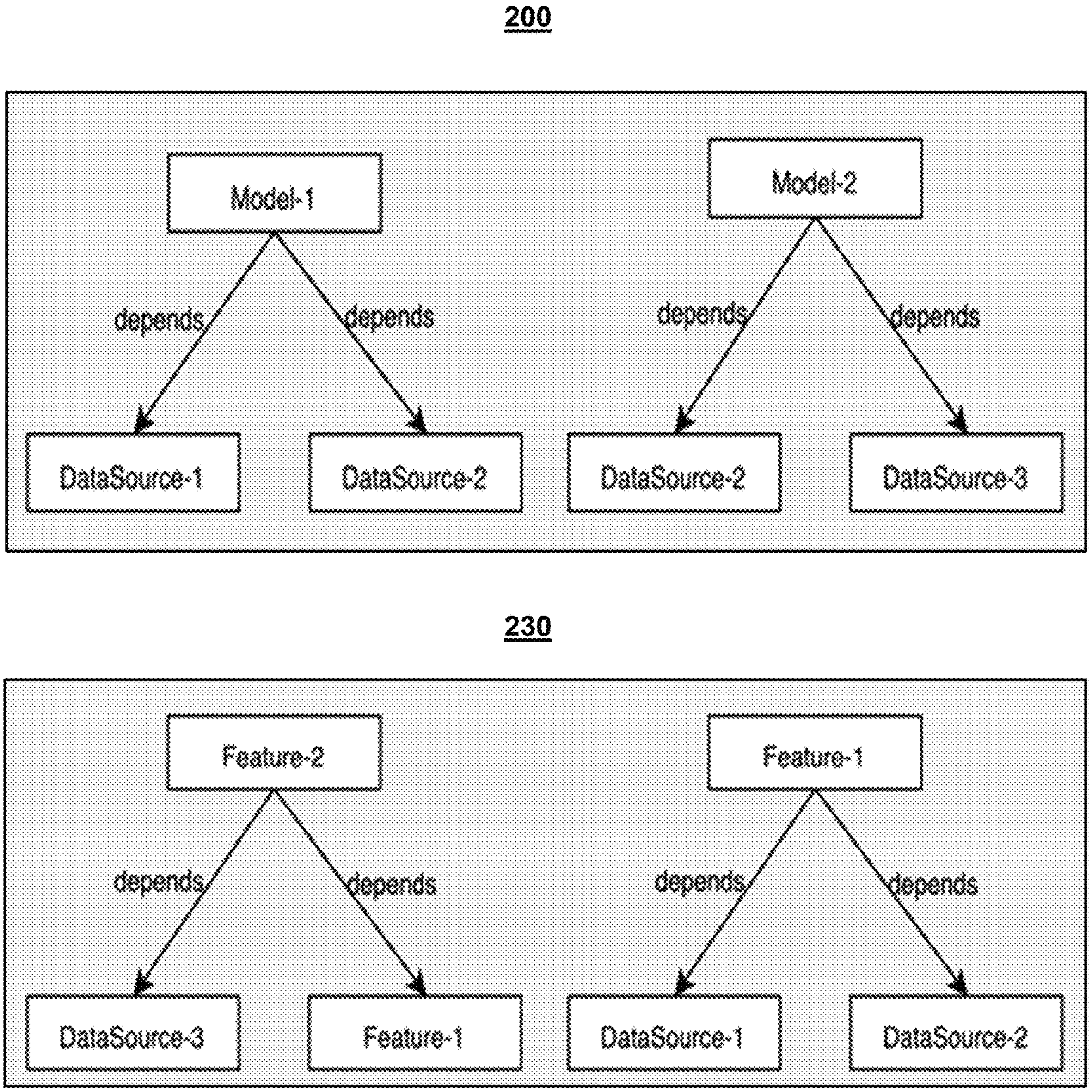
FIGS. 2A-B show an illustrative diagram for composing a workflow at runtime based on an incoming request, in accordance with one or more embodiments.
Figure 2B:
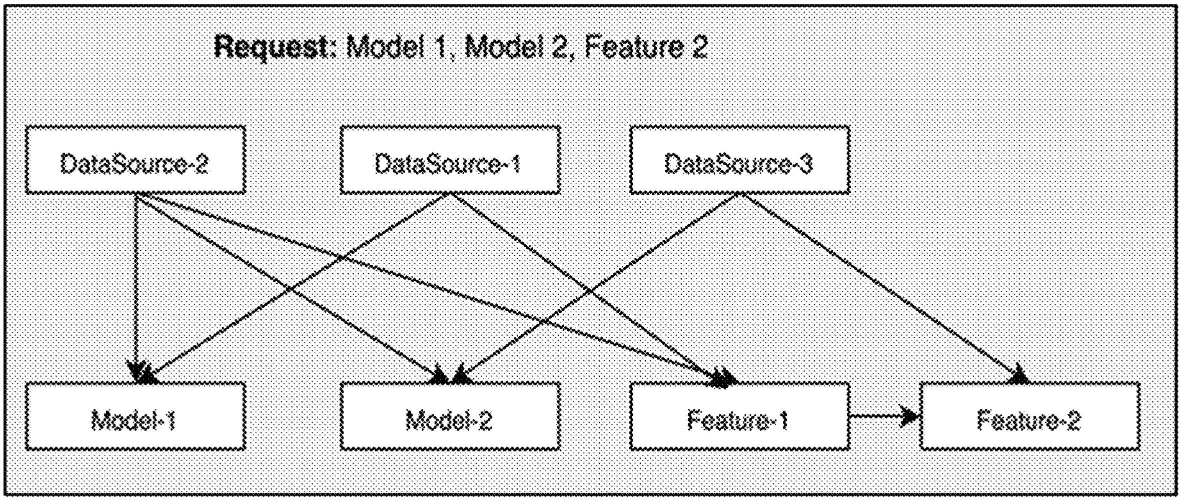
Figure 2B:
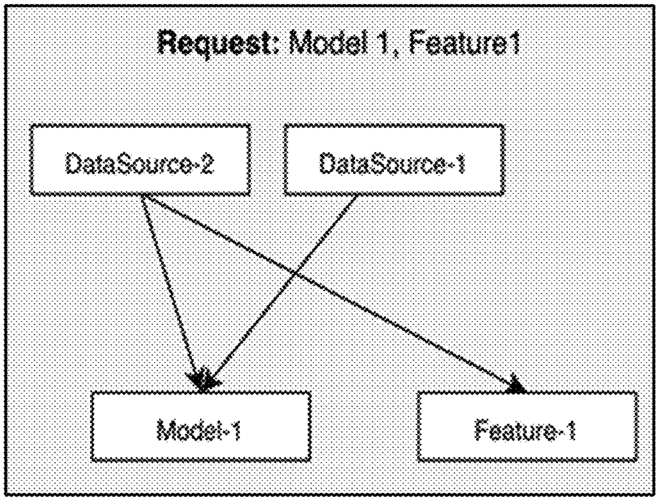

FIGS. 2A-B show an illustrative diagram for composing a workflow at runtime based on an incoming request, in accordance with one or more embodiments. As shown in FIG. 2A, table 200 includes model 1 and model 2 that depend on data source 1 and data source 2, respectively. Similarly, as shown in FIG. 2A, table 230 includes feature 1 that depends on data source 1 and data source 2. Table 230 includes feature 2 that depends on data source 3 and feature 1.

As shown in FIG. 2B, table 250 and table 270 show how a system determines a workflow at runtime based on the dependencies illustrated in FIG. 2A. For example, the system composes a workflow at runtime based on an incoming request for model 1, model 2, and feature 2 by dynamically analyzing the dependencies of each model and feature in real time. When the request is made, the system first identifies that model 1 depends on data source 1, while model 2 depends on data source 2. Additionally, it determines that feature 1 depends on both data source 1 and data source 2, and that feature 2 relies on data source 3 as well as feature 1.

To generate the workflow, the system uses a dynamic process, starting by mapping out the dependencies for each requested model and feature. It first determines that data source 1 and data source 2 are required for both model 1 and feature 1, so it sets up the necessary steps to retrieve data from these sources. Once data source 1 and data source 2 are available, the system can proceed with creating feature 1, since its dependencies have been resolved.

Next, the system identifies that feature 2 has a dependency on both feature 1 and data source 3. It waits for feature 1 to be generated, and after confirming that data source 3 is available, it proceeds to compute feature 2. In parallel, the system ensures that model 1 and model 2 are generated using their respective data sources once they are available. The system dynamically orchestrates the workflow in this way, building the process based on immediate dependencies, without needing to predefine the entire tree upfront. As the necessary data and features are produced, the system executes each step in sequence or in parallel, optimizing the workflow for efficiency. This real-time workflow composition ensures that data is pulled only when needed and that models and features are generated in the correct order, streamlining execution and minimizing latency.

Figure 3:
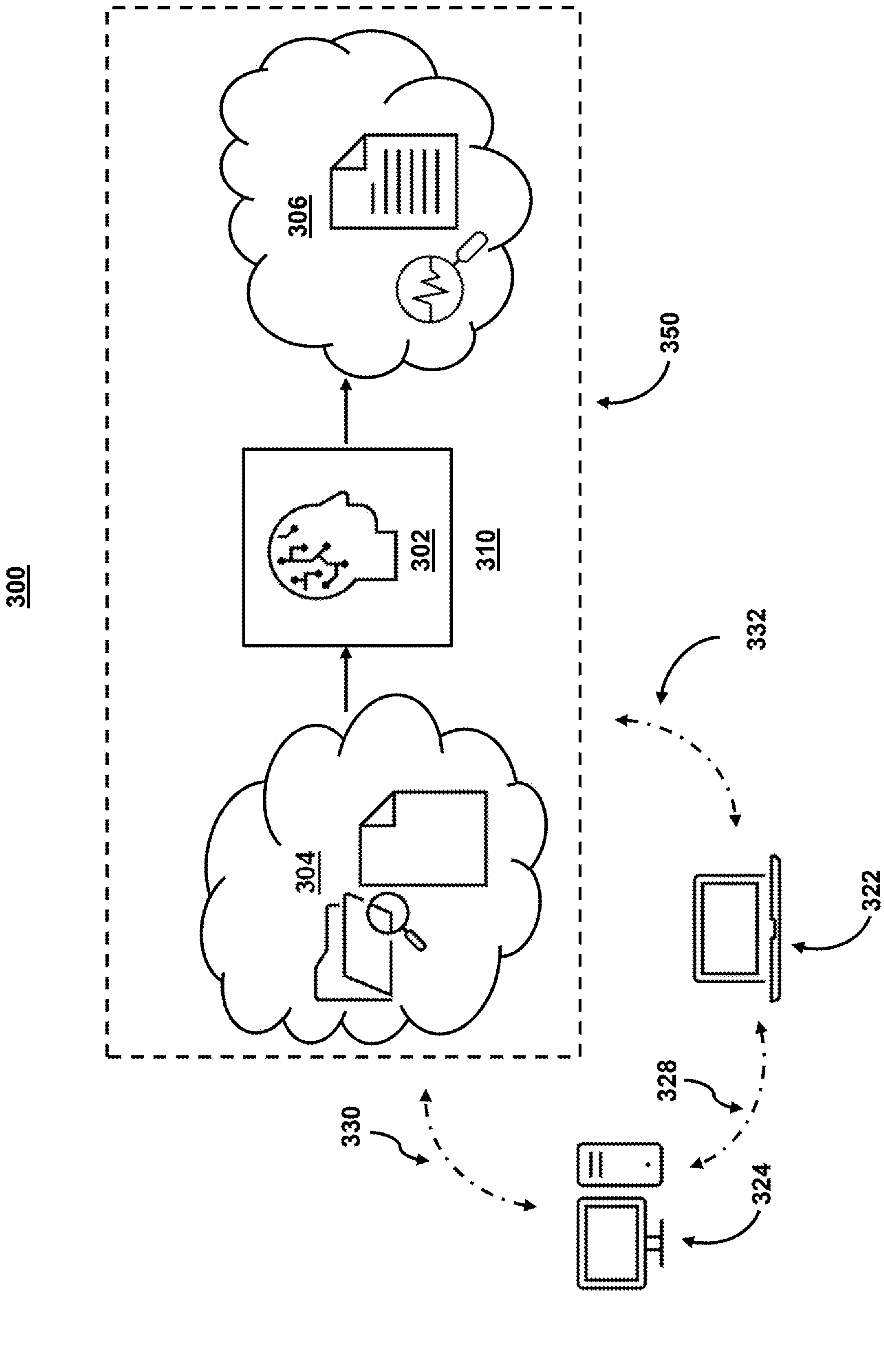
FIG. 3 shows illustrative components for a system used to dynamically generate a microservice orchestration, in accordance with one or more embodiments.

FIG. 3 shows illustrative components for a system used to dynamically generate a microservice orchestration, in accordance with one or more embodiments. For example, FIG. 3 may show illustrative components for dynamic microservice orchestration. As one example, the system may dynamically manage and coordinate individual microservices to work together to deliver a larger application or service within a distributed architecture using Internet protocols.

For example, the system may receive a first network routing request for initiating a first microservice orchestration workflow process across a plurality of computer network addresses, wherein the first network routing request comprises a workflow process input address for the first microservice orchestration workflow process and a requested network process output address for the first microservice orchestration workflow process. The system may receive a first network routing request for initiating a first microservice orchestration workflow process across a plurality of computer network addresses by accepting the request through a designated interface, such as an API gateway or a message queue. This network routing request includes two key components: a workflow process input address and a requested network process output address. The workflow process input address specifies the location, typically represented by a network address (such as an IP address or URL), where the system can retrieve the input data required to initiate the microservice orchestration workflow. This input data may include parameters, configurations, or any other information needed to trigger and guide the workflow's execution. Simultaneously, the request includes a requested network process output address, which indicates where the final result or output of the entire microservice orchestration process should be sent once the workflow is completed. This address allows the system to know exactly where to route the outcome of the process, ensuring that the output reaches the correct destination, which could be another service, a database, or a client application. Upon receiving the network routing request, the system interprets the input address to initiate the first microservice orchestration workflow by retrieving the input data from the specified location. The system then coordinates the various microservices across the network, handling the workflow execution by interacting with multiple computer network addresses as needed. Throughout the process, the system ensures that data flows efficiently between the microservices and, once the workflow is complete, transmits the result to the designated output address. By leveraging the workflow process input and output addresses, the system ensures that the microservice orchestration workflow is seamlessly executed and the desired outcome is delivered to the appropriate endpoint.

The system may, without defining a remaining dependency workflow for the first microservice orchestration workflow process, determine a first computer network address of the plurality of computer network addresses for servicing the first microservice orchestration workflow process that corresponds to the workflow process input address. For example, the system, without predefining the remaining dependency workflow for the first microservice orchestration workflow process, may determine a first computer network address from a plurality of available network addresses by analyzing the workflow process input address and dynamically identifying the appropriate service or resource. Upon receiving the request, the system interprets the input address, which typically contains information such as a URL, IP address, or other network identifiers that point to the location where the necessary input data or service resides. The system then utilizes this input address to query or resolve which specific microservice, hosted on a first computer network address, should handle the initial task of the workflow. This determination is made by examining metadata, routing rules, or service registries associated with the microservices available in the network. These registries or lookup tables contain mappings between services and their respective network addresses, enabling the system to find the appropriate node that can process the initial input without needing to define the entire sequence of dependencies ahead of time. Once the system identifies the correct network address for servicing the first step of the microservice orchestration workflow, it routes the input data to this first computer network address, where the relevant microservice or process can begin execution. This dynamic determination allows the system to proceed incrementally, resolving the immediate steps as required by the workflow and ensuring that the orchestration can proceed efficiently without the need for a fully predefined dependency tree. This flexible approach facilitates real-time orchestration, enabling the system to adjust to changing conditions and service availability across the network.

The system may determine, based on a characteristic of the first computer network address, a first network address input and a first network address output. For example, the system may determine a first network address input and first network address output based on a characteristic of the first computer network address by analyzing the attributes associated with that address, such as the type of service or resource it hosts, its data handling capabilities, or its role within the microservice orchestration workflow. When the system identifies the first computer network address, it evaluates specific characteristics—such as the protocols supported (e.g., HTTP, REST, or gRPC), the data formats required (e.g., JSON, XML), or the microservice's function (e.g., data retrieval, processing, or transformation)—to define how input data should be structured and what type of output can be expected. For instance, if the first computer network address corresponds to a service that processes user authentication, the first network address input would likely consist of credentials such as a username and password, formatted according to the service's requirements. The first network address output would then be a response indicating whether the authentication was successful, such as a token or a confirmation status. The system dynamically determines the first network address input by referencing metadata, API documentation, or service descriptions associated with the first network address. It tailors the data sent to the service based on these characteristics, ensuring compatibility and proper execution. Similarly, the system anticipates the first network address output by understanding the expected response format and data type that the service will generate. This process allows the system to route the correct data to the first network address and handle the output appropriately, enabling smooth execution of the microservice orchestration workflow. By leveraging the characteristics of the network address, the system ensures that the inputs and outputs for each step are aligned with the requirements of the services involved, facilitating a dynamic and efficient workflow.

The system may determine, based on a characteristic of the first network address input and a characteristic of the first network address output, a first subset of computer network addresses for servicing a second microservice orchestration workflow process. The system determines a first subset of computer network addresses for servicing a second microservice orchestration workflow process by analyzing the characteristics of the first network address input and first network address output. This involves evaluating the data formats, dependencies, and processing requirements identified in the first microservice orchestration step, and determining which services or microservices are needed to continue the workflow. Based on the first network address input, the system understands the type of data that was sent to the first service-such as data format (e.g., JSON, XML), content type (e.g., customer information, product details), or parameters required by that service. After the first network address processes the input, the first network address output provides a result, such as processed data, an authentication token, or other relevant information that serves as the output of the initial step. Using the characteristics of this output-such as its data type, format, or the specific action it enables—the system determines the next steps in the workflow and identifies the appropriate services that can handle this data. For instance, if the first network address output is a processed dataset, the system may identify that the next logical step in the workflow requires data transformation or storage, and therefore determines which microservices are capable of handling this specific type of output. These services could be located across a subset of network addresses that specialize in tasks such as data transformation, enrichment, or storage, depending on the nature of the output. The system then selects the first subset of computer network addresses—each corresponding to a specific service or microservice needed to complete the second microservice orchestration workflow. This selection is based on matching the output characteristics (such as data type, size, and format) to the capabilities of the services hosted at these network addresses. These addresses are then used to route the data to the appropriate next steps in the workflow. By dynamically mapping input and output characteristics to relevant network addresses, the system efficiently orchestrates the second microservice workflow process, ensuring that each stage is serviced by the correct microservice. This approach optimizes the orchestration process by routing data in real time based on its specific characteristics and processing needs, facilitating a seamless continuation of the workflow.

The system may, without defining the remaining dependency workflow for the first microservice orchestration workflow process, determine a second network address output based on a characteristic of the first subset of computer network addresses. For example, the system may, without predefining the remaining dependency workflow for the first microservice orchestration workflow process, determine a second network address output by analyzing the characteristics of the first subset of computer network addresses. These characteristics include the specific services hosted at these addresses, their capabilities, and how they process the data received from previous steps in the workflow. Once the system identifies the first subset of computer network addresses, it evaluates what each address specializes in-such as data transformation, computation, or aggregation- and how they handle the input provided by the earlier steps. Based on this understanding, the system predicts the nature of the output that will be generated by these network addresses. For example, if the services at the first subset of addresses perform data enrichment, the system anticipates that the output will be enriched data in a specific format. Similarly, if the services handle computations or analytics, the output might be a calculated result or a summary of processed data. The system uses this information to dynamically determine the second network address output, which refers to the result produced by the processing at the first subset of addresses. The system does not need to define the entire dependency workflow beforehand; instead, it focuses on the immediate outputs based on the known characteristics of the services within the first subset. This includes understanding the data types, formats, and potential transformations that these services are expected to perform. By leveraging the characteristics of the first subset of computer network addresses-such as their role in processing, the type of data they output, and their operational capabilities—the system can efficiently generate the second network address output. This output then becomes the next critical piece of data for either continuing the workflow or being passed to subsequent services in the orchestration process. This real-time, adaptive approach ensures that the system efficiently handles complex workflows without the need for fully predefined dependencies, enabling flexible and optimized orchestration across multiple services.

The system may determine, based on a characteristic of the second network address output, a second computer network address of the first microservice orchestration workflow process. For example, the system may determine a second computer network address of the first microservice orchestration workflow process based on a characteristic of the second network address output by analyzing the nature of the data or result produced at the second network address and matching it to the requirements of the next step in the workflow. The system begins by examining key characteristics of the output-such as its data type, format, content, or any processing state it reflects- and uses this information to identify which service or microservice, located at a second computer network address, is best suited to handle the output for further processing. For example, if the second network address output consists of enriched or transformed data, the system evaluates what type of processing or action is required next. This could involve tasks like further computation, storage, or passing the data to another service for more advanced operations such as analytics or reporting. The system then references its service registry, which contains information about available services and their corresponding network addresses, and identifies which second computer network address corresponds to a service capable of handling the output characteristics. The system makes this determination dynamically, without the need for a predefined, rigid workflow. By focusing on the specific attributes of the output-such as its format, metadata, or the state of processing—the system selects a network address that hosts a microservice designed to process or act on that output. For instance, if the output is raw data requiring aggregation, the system might direct it to a service specialized in data aggregation, hosted at the identified second network address. This approach ensures that the system continuously adapts the workflow based on real-time data and processing needs, dynamically routing outputs to the appropriate network addresses as the workflow progresses. As a result, the system optimizes the orchestration by responding to the specific characteristics of each output and directing it to the most suitable service, ensuring efficient and flexible execution across the network.

The system may transmit the second network address output to the second computer network address. For example, the system may transmit the second network address output to the second computer network address by following a series of steps that ensure the output is correctly routed to the appropriate destination for further processing. After determining the second computer network address based on the characteristics of the output, the system prepares the data for transmission, considering the required protocols, data formats, and network configurations to ensure compatibility between the sending and receiving services.

First, the system packages the second network address output into a format suitable for the microservice or endpoint at the second network address. This packaging process may involve transforming or encoding the data according to the specifications required by the target service (e.g., JSON, XML, or binary formats). The system also ensures that any necessary metadata or headers, such as authentication tokens, session information, or content-type identifiers, are included to facilitate secure and accurate transmission. Next, the system uses the appropriate communication protocol to send the data. Common protocols include HTTP/HTTPS, RESTful APIs, gRPC, or message queues (such as RabbitMQ or Kafka), depending on the requirements of the second computer network address. The system selects the most efficient and reliable protocol for the transmission based on factors like latency, security, and data size. Once the transmission is initiated, the system monitors the network connection to ensure that the data is successfully delivered. It may include error-checking mechanisms, such as retries, acknowledgments, or timeouts, to handle potential issues during transmission. If the system detects any failures or interruptions, it can reattempt the transmission or log the issue for further investigation. Upon successful delivery of the second network address output to the second computer network address, the receiving service processes the data as part of the ongoing microservice orchestration workflow. This dynamic and adaptive approach ensures that the workflow continues efficiently, with data being transmitted to the right network address at the right time, allowing the system to complete complex workflows without manual intervention.

As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, and other computer equipment (e.g., a server), including "smart," wireless, wearable, and/or mobile devices. FIG. 3 also includes cloud components 310. Cloud components 310 may alternatively be any computing device as described above, and may include any type of mobile terminal, fixed terminal, or other device. For example, cloud components 310 may be implemented as a cloud computing system, and may feature one or more component devices. It should also be noted that system 300 is not limited to three devices. Users may, for instance, utilize one or more devices to interact with one another, one or more servers, or other components of system 300. It should be noted, that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational response, queries, and/or notifications).

Additionally, as mobile device 322 and user terminal 324 are shown as touchscreen smartphones, these displays also act as user input interfaces. It should be noted that in some embodiments, the devices may have neither user input interfaces nor displays, and may instead receive and display content using another device (e.g., a dedicated display device such as a computer screen, and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

In some embodiments, system 300 and/or one or more models herein may be implemented using an application-specific integrated circuit. An integrated circuit may be a small electronic device made of semiconductor material, typically silicon, that contains a large number of microscopic electronic components such as transistors, resistors, capacitors, and diodes. These components are interconnected to perform a specific function or set of functions. Integrated circuits can be classified into various types based on their functionality, such as analog, digital, and mixed-signal ICs. The transistors within an IC are the primary building blocks, as they act as switches or amplifiers for electronic signals. The other components, like resistors and capacitors, are used for controlling voltage, current, and timing within the circuit. System 300 may design the integrated circuit to be application specific such that the design of the circuit is customized for a given application. In some embodiments, system 300 may use an integrated circuit system where one or more integrated circuit are spread throughout a system, network, and/or one or more devices. In such case, the system design may ensure that the circuits are integrated with other electronic components like connectors, power supplies, and sensors to form a complete and functional electronic system. This integration allows for the implementation of sophisticated tasks in devices needed for one or more specified applications.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may include model 302, which may be a machine learning model, artificial intelligence model, etc. (which may be referred collectively as "models" herein). In recent years, the use of artificial intelligence, including, but not limited to, machine learning, deep learning, etc. (referred to collectively herein as artificial intelligence models, machine learning models, or simply models) has exponentially increased. Broadly described, artificial intelligence refers to a wide-ranging branch of computer science concerned with building smart machines capable of performing tasks that typically require human intelligence. Key benefits of artificial intelligence are its ability to process data, find underlying patterns, and/or perform real-time determinations. However, despite these benefits and despite the wide-ranging number of potential applications, practical implementations of artificial intelligence have been hindered by several technical problems. First, artificial intelligence may rely on large amounts of high-quality data. The process for obtaining this data and ensuring it is high-quality can be complex and time-consuming. Additionally, data that is obtained may need to be categorized and labeled accurately, which can be difficult, time-consuming and a manual task. Second, despite the mainstream popularity of artificial intelligence, practical implementations of artificial intelligence may require specialized knowledge to design, program, and integrate artificial intelligence-based solutions, which can limit the amount of people and resources available to create these practical implementations. Finally, results based on artificial intelligence can be difficult to review as the process by which the results are made may be unknown or obscured. This obscurity can create hurdles for identifying errors in the results, as well as improving the models providing the results.

Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction.

For example, A system determines the first node input and first node output based on the first network node by utilizing an artificial intelligence model that has been specifically trained for dynamic workflow creation. The system begins by retrieving the model, which has been trained on a first training data set comprising historical requests and historical microservice orchestration workflows. This training data set enables the model to learn patterns, dependencies, and optimal pathways from previous orchestration workflows, allowing it to predict and determine inputs and outputs for future processes dynamically.

Once the model is retrieved, the system uses it to analyze the characteristics of the first network node and the broader context of the workflow process. The model applies its learned knowledge to predict the most appropriate first node input by considering similar historical workflows, relevant input data, and the type of task the first node is intended to perform. The model also considers the desired output for the entire workflow, enabling it to generate an optimal first-node output based on historical outputs of similar workflows.

Through this process, the model dynamically adapts to the specific requirements of the current orchestration workflow. By leveraging historical data, the system can automatically generate inputs and predict outputs for the first node without manual intervention, resulting in a more efficient and intelligent orchestration process. This approach allows for a more flexible and adaptive workflow that can evolve based on real-time data, historical trends, and the model's predictive capabilities, ultimately ensuring that the microservice orchestration is optimized for the task at hand.

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors be sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, backpropagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302 (e.g., a subset of nodes for a second microservice orchestration workflow).

In some embodiments, the model (e.g., model 302) may automatically perform actions based on outputs 306. In some embodiments, the model (e.g., model 302) may not perform any actions. The output of the model (e.g., model 302) may be used to dynamically orchestrate a microservice workflow.

In some embodiments, the system may generate predictions related to financial services. For example, the system may use one or more models and/or application to process a variety of data to generate predictions for tasks such as payment card eligibility determinations, fraud detection, and/or determining rates for auto-finance applications. For credit card eligibility, the model may use data such as the applicant's credit score, income, employment history, debt-to-income ratio, and past credit history. This data helps the model predict the likelihood of the applicant repaying the credit card debt. For fraud detection, models analyze transaction data, including the amount, location, frequency, and pattern of transactions. They compare these patterns to known fraudulent behavior to identify potentially fraudulent activities. For determining auto-finance rates, models might use the applicant's credit score, loan amount, loan term, vehicle details, and market interest rates. The data used by these models comes from various sources, including credit bureaus, financial institutions, customer-provided information, transaction records, and public records. By analyzing these data points, models can make informed predictions and decisions that help financial institutions manage risk, provide appropriate services, and enhance customer satisfaction.

In some embodiments, the model may process received data through several stages. For example, the model may collect and aggregate data from various sources (e.g., a user account, industry data, third-party data sources, etc.). The system may ensure the data is cleaned and preprocessed to handle any missing and/or inconsistent information. This preprocessing may include normalizing numerical data, encoding categorical variables, and applying techniques to handle outliers. The model may then use feature engineering to identify and create relevant features that can improve its predictive power. For instance, the system may derive new variables from existing ones, such as calculating the debt-to-income ratio from debt and income data.

Once the data is prepared, the system feeds the data into the model, which could be an artificial intelligence algorithm such as logistic regression, decision trees, and/or neural networks. The model may be trained on historical data, learning patterns, and/or relationships between input features and the target outcomes. During this training process, the system may adjust the model parameters to minimize prediction errors. After training, the system may validate the model and test the model using separate data sets to ensure the model has a predetermined and/or threshold accuracy and generalizability.

In some embodiments, the system may use specialized predictions based on the task. Additionally or alternatively, the system may adjust the inputs and/or outputs based on the determinations and/or predictions required. For example, for credit card eligibility, the model may evaluate the applicant's likelihood of defaulting on payments. In fraud detection, the model may identify anomalies and patterns indicative of fraudulent behavior. In auto-finance rate determination, the model may predict the risk associated with lending to an individual and adjusts the interest rates accordingly. In some embodiments, the entire process may be iterative, with models continually updated and refined as new data becomes available, ensuring they remain effective in making accurate and reliable predictions.

System 300 also includes API layer 350. API layer 350 may allow the system to generate summaries across different devices. In some embodiments, API layer 350 may be implemented on mobile device 322 or user terminal 324. Alternatively or additionally, API layer 350 may reside on one or more of cloud components 310. API layer 350 (which may be A REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open-source API Platforms and their modules. API layer 350 may use a developer portal. API layer 350 may use strong security constraints applying WAF and DDoS protection, and API layer 350 may use RESTful APIs as standard for external integration.

Figure 4:
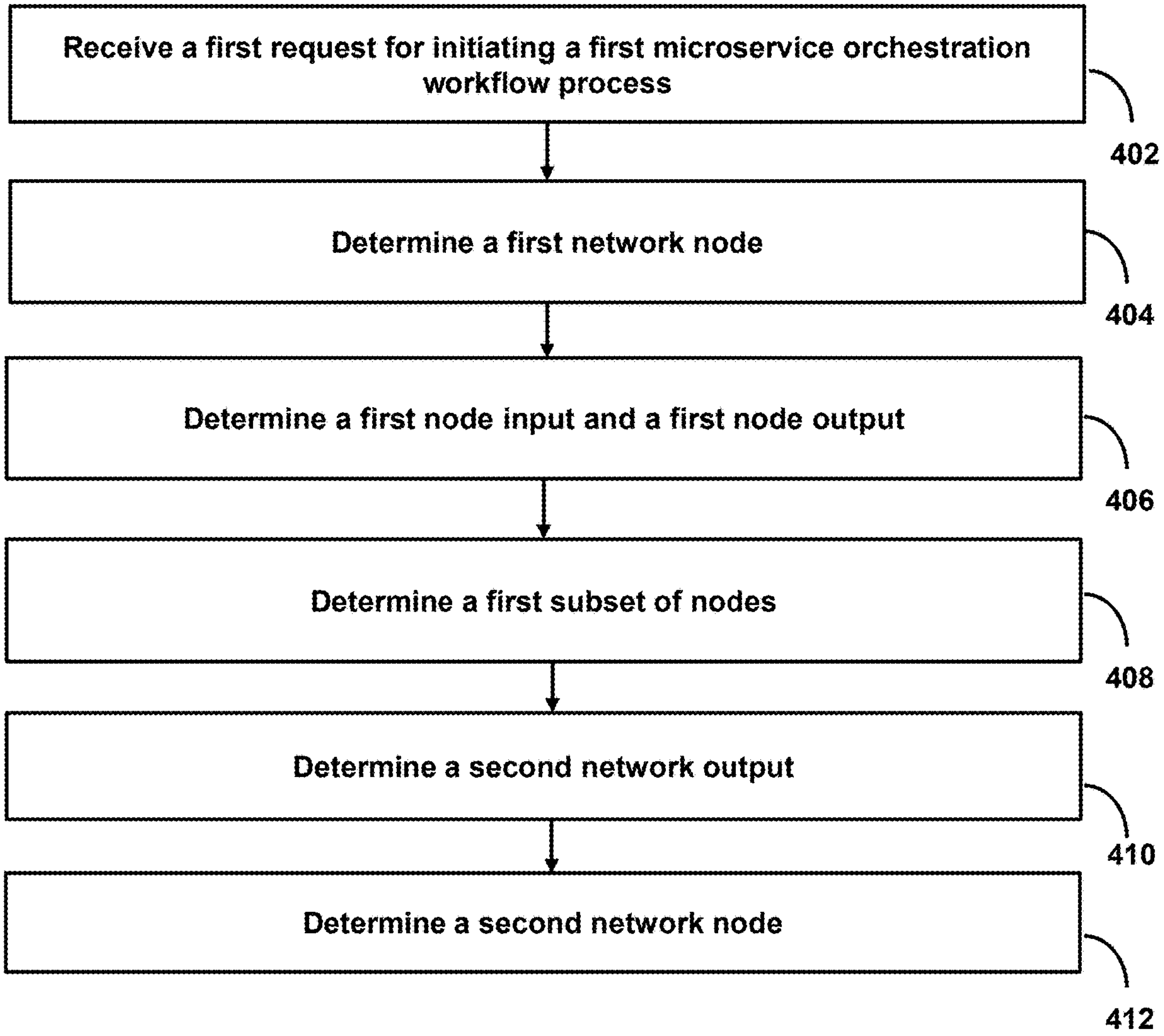
FIG. 4 shows a flowchart of the steps involved in dynamic microservice orchestration, in accordance with one or more embodiments.

FIG. 4 shows a flowchart of the steps involved in dynamic microservice orchestration, in accordance with one or more embodiments. For example, the system may use process 400 (e.g., as implemented on one or more system components described above) in order to provide dynamic microservice orchestration. For example, in some embodiments, process 400 may dynamically manage and coordinate individual microservices to work together to deliver a larger application or service within a distributed architecture using Internet protocols.

At step 402, process 400 (e.g., using one or more components described above) receives a first request for initiating a first microservice orchestration workflow process. For example, the system may receive a first request for initiating a first microservice orchestration workflow process, wherein the first request comprises a workflow process input for the first microservice orchestration workflow process and a requested network process output for the first microservice orchestration workflow process. For example, the system may receive a first request for initiating a microservice orchestration workflow process through an interface, such as an API or message queue, specifically designed to handle such requests. The request typically includes the necessary details to trigger the workflow, such as a workflow process input, which may consist of data or parameters required for the microservices to perform their tasks. Additionally, the request outlines a requested network process output, specifying the desired result or outcome of the entire orchestration process. Upon receiving this request, the system interprets the workflow process input, determines the necessary microservices that need to be executed in a particular sequence, and coordinates their interactions accordingly to produce the requested network process output. This orchestration process ensures that the system leverages various microservices in a distributed and efficient manner to complete complex tasks while managing dependencies and data flow across different components of the system.

At step 404, process 400 (e.g., using one or more components described above) determines a first network node. For example, the system may, without defining a remaining dependency workflow for the first microservice orchestration workflow process, determine a first network node of the first microservice orchestration workflow process corresponding to the workflow process input. For example, the system may determine a first network node in a microservice orchestration workflow by analyzing the workflow process input and identifying the initial task or microservice that needs to be executed in the workflow. This first network node may be selected, by the system, based on the nature of the input data or the specific functionality required to initiate the orchestration. Without needing to define the entire dependency workflow at this stage, the system focuses on determining the most relevant starting point-often the microservice responsible for the initial processing of the input. This could involve checking service registries, dependency mappings, or orchestration rules that specify which microservice is suited to handle the first step in the process. Once identified, this first network node becomes the entry point for the orchestration workflow, triggering the subsequent tasks and interactions with other microservices, ultimately leading to the desired output. The system can then proceed dynamically, determining dependencies and subsequent nodes as the workflow progresses.

At step 406, process 400 (e.g., using one or more components described above) determines a first node input and a first node output. For example, the system may determine, based on the first network node of the first microservice orchestration workflow process, a first node input for the first network node and a first node output for the first network node. For example, the system may determine the first node input and first node output by analyzing the role of the first network node within the microservice orchestration workflow. Once the first network node is identified, the system examines the requirements for executing this node, which includes understanding what data or parameters are needed to trigger its operation. This data, derived from the overall workflow process input, is designated as the first node input. The system may use predefined mappings, schemas, or service-specific configurations to ensure that the input matches the expected format and structure required by the first node. Once the first network node executes its task, the system captures the result produced by this node, which becomes the first node output. This output may be a transformation or processing of the initial input, a status update, or new data generated by the first node's operation. The first node output can either serve as an intermediate result within the workflow, passed to subsequent nodes for further processing, or represent part of the final network process output if the workflow is more straightforward. In this way, the system dynamically manages the flow of inputs and outputs as it progresses through the orchestration process.

In some embodiments, the system may determine, based on the first network node, the first node input and the first node output by comparing the first node input to the workflow process input and determining that the first node input has no dependencies based on comparing the first node input to the workflow process input. For example, the system may determine the first node input and first node output based on the first network node by comparing the first node input to the overall workflow process input. This comparison allows the system to assess whether the first node input has any dependencies that need to be satisfied before executing the first network node. Specifically, the system examines the structure, data, and parameters of the first node input and compares them to the workflow process input to determine if the first node requires any data transformations, prerequisites, or inputs from other nodes. If the comparison reveals that the first node input directly matches or aligns with the workflow process input—meaning that the input for the first node can be directly provided from the initial workflow request—the system determines that the first node input has no dependencies. In other words, the first network node can proceed immediately without waiting for other nodes to provide input or perform preparatory tasks. As a result, the system proceeds to execute the first network node using the determined first node input. Once the first node completes its task, the system captures the first node output, which may serve as input for subsequent nodes in the workflow or as part of the final process output. By identifying that the first node input has no dependencies, the system can streamline the workflow execution, allowing it to begin processing the first node without unnecessary delays or additional steps. This ensures an efficient and seamless initiation of the microservice orchestration workflow.

In some embodiments, the system may determine that the first node input has no dependencies based on comparing the first node input to the workflow process input by determining to execute the first network node and executing the first network node. For example, the system may determine that the first node input has no dependencies by comparing the first node input to the workflow process input and analyzing whether the input required by the first network node is already satisfied by the initial workflow request. This comparison involves checking whether the data, parameters, or resources necessary for the first node to execute are provided directly by the initial workflow process input, without needing additional inputs or processing from other nodes in the workflow.

Once the system confirms that the first node input matches the workflow process input and requires no further preparation or dependency resolution, it determines that the first network node can be executed immediately. This decision is based on the conclusion that the node can operate independently of other nodes and does not rely on prior steps or external data. Following this determination, the system proceeds to execute the first network node, using the available first node input. During execution, the node processes the input according to its task in the workflow and generates a corresponding first node output. This output is then used either as input for subsequent nodes or as part of the final output of the overall workflow. By identifying that the first node input has no dependencies, the system can streamline the execution process, allowing the first node to be processed without delay and ensuring an efficient progression through the microservice orchestration.

In some embodiments, the system may determine, based on the first network node, the first node input and the first node output by comparing the first node input to the workflow process input, determining that the first node input has a dependency based on comparing the first node input to the workflow process input, and pausing execution of the first network node based on determining that the first node input has the dependency. The system may determine the first node input and first node output based on the first network node by comparing the first node input to the workflow process input to identify any dependencies. During this comparison, the system analyzes whether the data, parameters, or resources required by the first network node are fully provided by the workflow process input or if additional input or processing is needed from other parts of the workflow. If the system identifies that the first node input does not fully align with the workflow process input, it recognizes that the first node input has a dependency.

This dependency might involve receiving additional data from another microservice, a transformation step, or a specific condition that must be met before the first network node can proceed. Based on this determination, the system pauses the execution of the first network node, recognizing that it cannot proceed until the required dependency is resolved. The system may trigger other microservices or workflow tasks to fulfill this dependency, such as executing another node that generates the needed data or performing a preparatory operation.

Once the dependency is addressed and the necessary input becomes available, the system can resume the execution of the first network node, using the newly fulfilled input to process the task. By pausing execution when a dependency is detected, the system ensures that each node operates with the correct inputs, maintaining the integrity of the workflow and preventing errors that could arise from executing tasks with incomplete or incorrect data. This approach supports a smooth and orderly execution of the microservice orchestration, ensuring that each step progresses only when all dependencies are satisfied.

In some embodiments, the system may pause the execution of the first network node based on determining that the first node input has the dependency by determining a third network node corresponding to the dependency, executing the third network node, unpausing the execution of the first network node based on executing the third network node, determining to execute the first network node, and executing the first network node. For example, the system may pause the execution of the first network node upon determining that the first node input has a dependency by identifying that the required input is not yet available or needs further processing. In response, the system determines that a third network node corresponds to this dependency-essentially a microservice or task that must be executed to fulfill the required input for the first node. The system identifies the third network node by analyzing the dependency, understanding what data or conditions are needed to proceed with the first node, and mapping this requirement to the appropriate task within the workflow. Once the third network node is identified, the system executes it. The third network node processes the necessary data or performs the required task to generate the input or condition that the first network node depends on. While the third node is executing, the system keeps the first network node in a paused state, ensuring that it does not attempt to proceed until the dependency has been resolved. After the third network node completes its execution and provides the necessary data or input, the system resumes execution of the first network node. At this point, the system re-evaluates the state of the first node input, confirming that the dependency has been satisfied. Upon this confirmation, the system determines that the first network node is ready to proceed. Finally, the system resumes and executes the first network node, using the input provided by the third network node to process the task correctly. This approach ensures that the workflow progresses in a controlled and orderly fashion, where dependent tasks are handled sequentially or in the correct order, avoiding errors or incomplete executions caused by missing or unavailable inputs.

In some embodiments, the system may pause the execution of the first network node based on determining that the first node input has the dependency by determining an error code corresponding to the dependency and generating for display, on a user interface, the error code. For example, the system pauses the execution of the first network node when it determines that the first node input has a dependency by identifying that the required input or resource is unavailable or incomplete. To handle this situation, the system assigns an error code corresponding to the specific dependency. This error code is generated based on predefined rules or configurations that map particular types of dependencies, such as missing data or unmet conditions, to specific error codes. Once the error code is determined, the system pauses the execution of the first network node to prevent it from proceeding with incomplete or incorrect data. The system then generates a notification for display on a user interface, presenting the error code along with any relevant details about the nature of the dependency and why the execution has been paused. This display allows users, such as system administrators or developers, to quickly understand the issue, identify which input or resource is missing, and take corrective action if necessary. By displaying the error code, the system enables transparency and provides insights into the workflow's current state, making it easier for users to troubleshoot and resolve the dependency. After the dependency is resolved—whether manually by a user or automatically by other parts of the system—the first network node can be resumed and the workflow can continue. This approach ensures that the system handles dependencies in a controlled manner while providing users with the information needed to address potential issues in real time.

In some embodiments, the system may determine, based on the first network node, the first node input and the first node output by determining a current network state and determining a modification to the first node input or the first node output based on the current network state. The system may determine the first node input and first node output based on the first network node by first assessing the current network state. The current network state refers to the real-time status of the system, including factors like resource availability, network conditions, system load, or ongoing operations across other microservices within the workflow. By evaluating this state, the system can understand how external factors or the overall orchestration environment might influence the execution of the first network node.

Once the current network state is determined, the system analyzes how this state affects the first node input or the first node output. For example, if the network state reveals that certain resources or data streams are delayed or unavailable, the system might need to modify the first node input, such as adjusting data formats, providing fallback data, or delaying execution until resources become available. Similarly, if the current network state indicates performance bottlenecks or constraints in processing capacity, the system might modify the expected first node output, such as generating a simplified output or rerouting the processing to handle changes in resource availability. By determining and modifying the first node input or output based on the current network state, the system ensures that the microservice orchestration remains flexible and resilient to dynamic conditions. This adaptability allows the workflow to proceed efficiently even when network conditions fluctuate, ensuring that the first network node- and ultimately the entire orchestration-operates in a manner optimized for the current state of the system.

In some embodiments, the system may determine, based on the first network node, the first node input and the first node output by retrieving a predefined rule set for dynamic workflow creation and determining a modification to the first node input or the first node output based on the predefined rule set. For example, the system may determines the first node input and first node output based on the first network node by retrieving a predefined rule set designed for dynamic workflow creation. This predefined rule set contains rules, conditions, and logic that govern how workflows should adapt and operate under varying circumstances, including the modification of inputs and outputs for individual nodes. The rule set might include guidelines for handling different types of data, managing dependencies, or reacting to specific events or conditions within the system.

Once the predefined rule set is retrieved, the system applies it to evaluate whether the first node input or first node output needs modification. For instance, the rules might specify that if certain data types are detected or if the workflow involves specific processing constraints, the input to the first network node should be transformed or augmented to ensure compatibility. Similarly, the rule set might dictate that if the output from the first network node does not meet certain criteria, it should be adjusted or processed further before passing it to the next step in the workflow.

By applying the predefined rule set, the system can automatically determine the necessary modifications to the first node input or output, ensuring that the workflow adheres to established best practices and operational guidelines. This approach allows for dynamic adaptation of the microservice orchestration, enabling the system to adjust inputs and outputs based on rules that optimize the workflow for efficiency, reliability, or compliance with specific business requirements. Through this rule-based modification, the system ensures that the first network node operates smoothly within the broader orchestration, maintaining the integrity and performance of the entire process.

At step 408, process 400 (e.g., using one or more components described above) determines a first subset of nodes. For example, the system may determine, based on the first node input and the first node output, a first subset of nodes, wherein the first subset of nodes performs a second microservice orchestration workflow process. For example, the system may determine a first subset of nodes corresponding to a second microservice orchestration workflow by analyzing the first node input and first node output to identify additional tasks or processes required to complete the broader workflow. Once the first node has processed its input and generated an output, the system evaluates the outcome to determine whether further orchestration is needed to complete the next steps. This analysis may involve predefined rules, dependencies, or dynamic conditions that dictate which tasks must follow the first node's execution. Based on this evaluation, the system identifies a subset of nodes—representing microservices—that are relevant for executing the subsequent tasks. These nodes form the basis of the second microservice orchestration workflow, a smaller workflow that handles specific tasks branching from the current node. The system then orchestrates this subset of nodes by coordinating their interactions, ensuring that the outputs of one node become inputs for the next, while adhering to any dependencies or order of execution required by the overall workflow. This recursive process allows the system to handle complex, multi-step workflows by breaking them down into manageable subsets, orchestrating microservices in an efficient and modular manner to achieve the desired results.

In some embodiments, the system determines, based on the first node input and the first node output, a first subset of nodes by determining a first data lineage requirement for the second microservice orchestration workflow process and determining the first subset of nodes based on the first data lineage requirement. For example, the system may determine a first subset of nodes for a second microservice orchestration workflow process by analyzing the first node input and first node output to establish a clear understanding of the data dependencies and flow within the workflow. The system begins by identifying a first data lineage requirement, which refers to the necessary tracking and transformation of data as it moves through various stages of the orchestration process. The data lineage requirement outlines how data must be handled, processed, or transformed to ensure accuracy, integrity, and compliance with the overall workflow objectives.

Based on this first data lineage requirement, the system determines which microservices or tasks need to be executed to maintain the proper flow of data from the first node to the subsequent steps in the workflow. This includes analyzing how the data generated by the first node output must be handled in terms of structure, dependencies, and downstream processing. The system then identifies a first subset of nodes—specific microservices responsible for fulfilling these data lineage requirements—by selecting those that can handle the data transformations, validations, or tasks needed to ensure the workflow continues correctly.

By selecting the first subset of nodes based on the data lineage requirements, the system ensures that each node in the subset is equipped to manage the input and output data correctly and that the overall data flow remains consistent with the workflow's goals. This approach ensures that the orchestration is driven by the actual needs of the data at each stage, allowing the system to adaptively manage complex workflows while maintaining a clear lineage of data transformations throughout the process.

In some embodiments, the system may determine, based on the first node input and the first node output, a first subset of nodes by determining a first data dependency for the second microservice orchestration workflow process and determining the first subset of nodes based on the first data dependency. A system determines a first subset of nodes for a second microservice orchestration workflow process by analyzing the first node input and first node output to identify key data dependencies that dictate how the data must be processed in subsequent steps. A first data dependency refers to the relationships or conditions between different pieces of data, where the output of one node directly impacts the input required by another node. These dependencies can include specific data formats, transformations, or conditions that must be met for the workflow to progress smoothly.

To identify the first data dependency, the system examines the first node output and determines what information is necessary for the next steps in the orchestration. For example, the system may identify that the output data needs further processing or enrichment before it can be used by other microservices in the workflow. This analysis of data dependencies helps the system understand how different nodes rely on each other and what order of execution is required to satisfy these dependencies.

Based on this first data dependency, the system selects the first subset of nodes-a group of microservices responsible for handling the specific tasks or transformations required by the dependency. These nodes are chosen because they can process the first node's output in a way that aligns with the data dependency, ensuring that the workflow continues to progress as expected. This subset of nodes is responsible for managing the flow and transformation of data according to the requirements identified by the data dependencies, ensuring that the second microservice orchestration workflow can proceed efficiently and correctly. By determining the first subset of nodes based on data dependencies, the system ensures that each subsequent step in the orchestration is properly aligned with the input-output relationships between nodes, enabling a smooth, coordinated workflow.

In some embodiments, the system may determine, based on the first node input and the first node output, a first subset of nodes by determining the second microservice orchestration workflow process comprises parallel microservice orchestration workflow processes, determining the first subset of nodes based on a first parallel microservice orchestration workflow process of the parallel microservice orchestration workflow processes, determining a second subset of nodes based on a second parallel microservice orchestration workflow process of the parallel microservice orchestration workflow processes, and executing the first parallel microservice orchestration workflow process, using the first subset of nodes, and the second parallel microservice orchestration workflow process, using the second subset of nodes, in parallel.

For example, the system may determine a first subset of nodes for a second microservice orchestration workflow process by first analyzing the first node input and first node output to establish whether the second microservice orchestration workflow involves parallel microservice orchestration workflow processes. Parallel workflows enable multiple microservices to operate concurrently, improving efficiency by allowing independent tasks to be executed simultaneously. To do this, the system evaluates the nature of the workflow and identifies tasks or processes that can be separated and executed independently without waiting for the completion of others.

Once the system identifies that the second microservice orchestration workflow involves parallel processes, it determines the first subset of nodes based on the requirements of the first parallel microservice orchestration workflow process. These nodes are selected to handle specific tasks that can be executed concurrently, using the first node output as input. In parallel, the system also identifies a second subset of nodes to handle the second parallel microservice orchestration workflow process, which operates independently but concurrently with the first.

After determining the respective subsets of nodes for both the first and second parallel workflows, the system executes the two parallel orchestration processes simultaneously. The first subset of nodes handles the tasks associated with the first parallel process, while the second subset of nodes performs the tasks required for the second parallel process. By running these workflows in parallel, the system maximizes resource efficiency and reduces overall execution time, allowing multiple processes to be completed faster than if they were run sequentially. The system ensures that both parallel workflows execute correctly, managing the synchronization and integration of their outputs if necessary to support the broader orchestration goals. This approach enables the system to dynamically orchestrate microservices in parallel, optimizing performance and adapting to complex workflows that involve multiple, independent processing paths.

In some embodiments, the system may determine, based on the first node input and the first node output, a first subset of nodes by determining that the second microservice orchestration workflow process comprises serial microservice orchestration workflow processes, determining the first subset of nodes based on a first serial microservice orchestration workflow process of the serial microservice orchestration workflow processes, determining a second subset of nodes based on a second serial microservice orchestration workflow process of the serial microservice orchestration workflow processes, and executing the first serial microservice orchestration workflow process, using the first subset of nodes, prior to executing the second serial microservice orchestration workflow process, using the second subset of nodes. For example, the system may determine a first subset of nodes for a second microservice orchestration workflow process by analyzing the first node input and first node output to establish whether the second microservice orchestration workflow involves serial microservice orchestration workflow processes. Serial workflows require tasks to be executed in a specific sequence, where the output of one step is necessary for the next step to begin. The system examines the dependencies between tasks and determines that the second orchestration workflow must proceed in a step-by-step, linear fashion.

Once it identifies that the second microservice orchestration workflow involves serial processes, the system determines the first subset of nodes based on the requirements of the first serial microservice orchestration workflow process. These nodes are responsible for handling the initial tasks in the sequence, processing the first node output and generating an output that serves as input for the subsequent workflow step. After executing the first serial process using the first subset of nodes, the system waits for its completion before proceeding to the next step.

The system then identifies a second subset of nodes based on the requirements of the second serial microservice orchestration workflow process. This second subset of nodes is responsible for handling the tasks that follow the completion of the first process. The second subset receives the output from the first subset of nodes and uses it as input to continue the workflow.

The system executes these serial microservice orchestration processes in sequence, ensuring that the first subset of nodes completes its tasks before initiating the second subset of nodes. This orderly execution guarantees that each microservice in the workflow has the necessary input to perform its role, maintaining the proper flow of data and processing through the entire orchestration. By executing the workflow in a serial manner, the system ensures that each step builds upon the previous one, adhering to dependencies and ensuring a coherent progression through the microservices.

At step 410, process 400 (e.g., using one or more components described above) determines a second network output. For example, the system may determine a second network output based on the first subset of nodes. For example, the system may determine a second network output by analyzing the results generated from the execution of the first subset of nodes within the second microservice orchestration workflow. As each node in this subset performs its assigned tasks, the system monitors the inputs, processes, and outputs at each stage. The outputs of individual nodes may be combined, transformed, or passed to subsequent nodes based on the orchestration logic and dependencies between services. Once the subset of nodes completes its workflow, the system aggregates the results to form the second network output. This second network output may represent a refined or intermediate result, produced through the coordinated efforts of the microservices in the subset, which could be an integral part of the overall workflow process. Depending on the workflow's complexity, this output may be further processed by additional nodes or passed along to subsequent stages of orchestration. The system ensures that the second network output aligns with the goals of the microservice orchestration and can be utilized as either a final output or as input for the next phase of processing within the larger workflow. By leveraging the outputs of the subset of nodes, the system ensures that each part of the orchestration contributes meaningfully to the completion of the overall task.

At step 412, process 400 (e.g., using one or more components described above) determines a second network node. For example, the system may, without defining the remaining dependency workflow for the first microservice orchestration workflow process, determine, based on the second network output, a second network node of the first microservice orchestration workflow process. For example, the system may determine a second network node within the first microservice orchestration workflow by analyzing the second network output produced by the first subset of nodes. Without requiring the full definition of the remaining dependency workflow, the system dynamically evaluates the current state of the process and identifies the next logical step. Based on the second network output, the system assesses which microservice or task should be executed next to continue the workflow. This assessment can be based on predefined orchestration rules, dynamic conditions, or dependency mapping that links specific outputs to subsequent nodes. Once the second network node is identified, the system routes the second network output as input to this node, triggering the appropriate microservice to perform its task. The second network node may handle further processing, decision-making, or interactions with other systems, depending on the workflow's requirements. By determining the second network node in this manner, the system can proceed efficiently without predefining the entire workflow, allowing it to adapt to real-time conditions and outputs as the orchestration process progresses. This flexibility ensures that the workflow can evolve based on the actual results produced at each stage, enabling dynamic and efficient orchestration of microservices.

In some embodiments, the system may transmit the second network output to the second network node. For example, the system may transmit the second network output to the second network node by first determining the second node input and second node output required for the second network node to execute its task within the overall orchestration process. The system begins by analyzing the characteristics and requirements of the second network node, such as the data formats, parameters, and dependencies needed to process the second network output as its input. Once the system has mapped the second network output to the necessary second node input, it transmits this data to the second network node, initiating the node's processing. After the second network node processes the second node input, it generates a second node output, which serves as the result of its operation. The system then evaluates this second node output and uses it to determine whether additional processing or orchestration is required. Based on the second node output, the system identifies a second subset of nodes that must be engaged to perform a third microservice orchestration workflow process. This subset may consist of microservices that further refine the data, transform it, or carry out specific tasks related to the overall workflow. The system orchestrates the interaction among the second subset of nodes by coordinating their inputs and outputs, ensuring that data flows smoothly between them. The third microservice orchestration workflow process is then executed by this subset, allowing the system to continue progressing through the overall workflow, dynamically adjusting the orchestration based on real-time outputs and requirements. This approach allows the system to efficiently manage complex workflows by breaking them into smaller, manageable processes, ensuring that each step is optimized for the task at hand and leveraging AI-driven orchestration when needed.

In some embodiments, the system transmits the second network output to the second network node by first determining whether the second network output aligns with the requested network process output. To do this, the system evaluates the second network output and compares it with the predefined outcome expected from the overall microservice orchestration workflow. If the second network output meets the criteria or matches the desired result specified in the original request, the system recognizes that the requested network process output has been achieved. Upon determining that the second network output corresponds to the requested network process output, the system does not need to continue processing through additional nodes. Consequently, the system decides to end the first microservice orchestration workflow process, as the desired outcome has been successfully generated. At this point, the system finalizes the workflow by completing any necessary post-processing tasks, such as logging the results, notifying dependent systems, or transmitting the final output to the requesting entity. By recognizing that the second network output satisfies the requirements of the workflow, the system can efficiently conclude the orchestration, avoiding unnecessary processing and resource use. This adaptive approach allows the system to dynamically adjust the execution of workflows, ensuring they end promptly once the desired results are obtained, thereby optimizing performance and reducing latency in service delivery.

In some embodiments, the system employs a data orchestration approach to streamline data retrieval across multiple nodes (models) with varying input requirements. Initially, the system analyzes all nodes to determine their data dependencies and aggregates these requirements into a unified data query plan. By mapping each node's needs to their respective data sources, the system ensures that no data source is queried more than once. The orchestrator consolidates and optimizes these requests, generating a single call per data source to fetch all necessary data at once. Once the data is retrieved, the system intelligently partitions the fetched dataset, serving each node only the specific subset it requires. This approach eliminates redundant calls to data sources, enhances efficiency, and reduces latency without relying on traditional caching mechanisms. By leveraging dynamic dependency resolution and optimized data delivery, the orchestrator achieves a streamlined and resource-efficient data-fetching process.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method, the method comprising dynamic microservice orchestration.

2. The method of the preceding embodiment, further comprising: receiving a first request for initiating a first microservice orchestration workflow process, wherein the first request comprises a workflow process input for the first microservice orchestration workflow process and a requested network process output for the first microservice orchestration workflow process; without defining a remaining dependency workflow for the first microservice orchestration workflow process, determining a first network node of the first microservice orchestration workflow process corresponding to the workflow process input; determining, based on the first network node of the first microservice orchestration workflow process, a first node input for the first network node and a first node output for the first network node; determining, based on the first node input and the first node output, a first subset of nodes, wherein the first subset of nodes performs a second microservice orchestration workflow process; determining a second network output based on the first subset of nodes; without defining the remaining dependency workflow for the first microservice orchestration workflow process, determining, based on the second network output, a second network node of the first microservice orchestration workflow process; and transmitting the second network output to the second network node.

3. The method of any one of the preceding embodiments, further comprising: in response to transmitting the second network output to the second network node, determining based on the second network node a second node input and a second node output; and determining, based on the second node input and the second node output, a second subset of nodes, wherein the second subset of nodes performs a third microservice orchestration workflow process.

4. The method of any one of the preceding embodiments, further comprising: in response to transmitting the second network output to the second network node, determining that the second network output corresponds to the requested network process output; and in response to determining that the second network output corresponds to the requested network process output, ending the first microservice orchestration workflow process.

5. The method of any one of the preceding embodiments, wherein determining, based on the first node input and the first node output, a first subset of nodes further comprises: determining a first data lineage requirement for the second microservice orchestration workflow process; and determining the first subset of nodes based on the first data lineage requirement.

6. The method of any one of the preceding embodiments, wherein determining, based on the first node input and the first node output, a first subset of nodes further comprises: determining a first data dependency for the second microservice orchestration workflow process; and determining the first subset of nodes based on the first data dependency.

7. The method of any one of the preceding embodiments, wherein determining, based on the first node input and the first node output, a first subset of nodes further comprises: determining the second microservice orchestration workflow process comprises parallel microservice orchestration workflow processes; determining the first subset of nodes based on a first parallel microservice orchestration workflow process of the parallel microservice orchestration workflow processes; determining a second subset of nodes based on a second parallel microservice orchestration workflow process of the parallel microservice orchestration workflow processes; and executing the first parallel microservice orchestration workflow process, using the first subset of nodes, and the second parallel microservice orchestration workflow process, using the second subset of nodes, in parallel.

8. The method of any one of the preceding embodiments, wherein determining, based on the first node input and the first node output, a first subset of nodes further comprises:
   determining the second microservice orchestration workflow process comprises serial microservice orchestration workflow processes; determining the first subset of nodes based on a first serial microservice orchestration workflow process of the serial microservice orchestration workflow processes; determining a second subset of nodes based on a second serial microservice orchestration workflow process of the serial microservice orchestration workflow processes; and executing the first serial microservice orchestration workflow process, using the first subset of nodes, prior to executing the second serial microservice orchestration workflow process, using the second subset of nodes.

9. The method of any one of the preceding embodiments, wherein determining, based on the first network node, the first node input and the first node output further comprises: comparing the first node input to the workflow process input; and determining that the first node input has no dependencies based on comparing the first node input to the workflow process input.

10. The method of any one of the preceding embodiments, wherein determining that the first node input has no dependencies based on comparing the first node input to the workflow process input further comprises: determining to execute the first network node; and executing the first network node.

11. The method of any one of the preceding embodiments, wherein determining, based on the first network node, the first node input and the first node output further comprises: comparing the first node input to the workflow process input; determining that the first node input has a dependency based on comparing the first node input to the workflow process input; and pausing execution of the first network node based on determining that the first node input has the dependency.

12. The method of any one of the preceding embodiments, wherein determining, based on the first network node, the first node input and the first node output further comprises: determining a current network state; and determining a modification to the first node input or the first node output based on the current network state.

13. The method of any one of the preceding embodiments, wherein determining, based on the first network node, the first node input and the first node output further comprises: retrieving a predefined rule set for dynamic workflow creation; and determining a modification to the first node input or the first node output based on the predefined rule set.

14. The method of any one of the preceding embodiments, wherein determining, based on the first network node, the first node input and the first node output further comprises: retrieving an artificial intelligence model, wherein the artificial intelligence model is trained for dynamic workflow creation based on a first training data set, wherein the first training data set comprises historical requests and historical microservice orchestration workflows; and using the artificial intelligence model to determine the first node input and the first node output.

15. The method of any one of the preceding embodiments, wherein pausing the execution of the first network node based on determining that the first node input has the dependency further comprises: determining a third network node corresponding to the dependency; executing the third network node; unpausing the execution of the first network node based on executing the third network node; determining to execute the first network node; and executing the first network node.

16. The method of any one of the preceding embodiments, wherein pausing the execution of the first network node based on determining that the first node input has the dependency further comprises: determining an error code corresponding to the dependency; and generating for display, on a user interface, the error code.

17. One or more non-transitory, computer-readable mediums storing instructions that, when executed by a data processing apparatus, cause the data processing apparatus to perform operations comprising those of any of embodiments 1-16.

18. A system comprising one or more processors; and memory storing instructions that, when executed by the processors, cause the processors to effectuate operations comprising those of any of embodiments 1-16.

19. A system comprising means for performing any of embodiments 1-16.

What is claimed is:

1. A system for dynamically managing and coordinating individual microservices to work together to deliver a larger application or service within a distributed architecture using Internet protocols, the system comprising:

receiving a first network routing request for initiating a first microservice orchestration workflow process across a plurality of computer network addresses, wherein the first network routing request comprises a workflow process input address for the first microservice orchestration workflow process and a requested network process output address for the first microservice orchestration workflow process;

without defining a remaining dependency workflow for the first microservice orchestration workflow process, determining a first computer network address of the plurality of computer network addresses for servicing the first microservice orchestration workflow process that corresponds to the workflow process input address;

determining, based on a characteristic of the first computer network address, a first network address input and a first network address output;

determining, based on a characteristic of the first network address input and a characteristic of the first network address output, a first subset of computer network addresses for servicing a second microservice orchestration workflow process;

without defining the remaining dependency workflow for the first microservice orchestration workflow process, determining a second network address output based on a characteristic of the first subset of computer network addresses;

determining, based on a characteristic of the second network address output, a second computer network address of the first microservice orchestration workflow process; and transmitting the second network address output to the second computer network address.

2. A method for dynamic network routing during microservice orchestration, the method comprising:

receiving a first request for initiating a first microservice orchestration workflow process, wherein the first request comprises a workflow process input for the first microservice orchestration workflow process and a requested network process output for the first microservice orchestration workflow process;

without defining a remaining dependency workflow for the first microservice orchestration workflow process, determining a first network node of the first microservice orchestration workflow process corresponding to the workflow process input;

determining, based on the first network node of the first microservice orchestration workflow process, a first node input for the first network node and a first node output for the first network node;

determining, based on the first node input and the first node output, a first subset of nodes, wherein the first subset of nodes performs a second microservice orchestration workflow process;

determining a second network output based on the first subset of nodes;

without defining the remaining dependency workflow for the first microservice orchestration workflow process, determining, based on the second network output, a second network node of the first microservice orchestration workflow process; and transmitting the second network output to the second network node.

3. The method of claim 2, further comprising:

in response to transmitting the second network output to the second network node, determining based on the second network node a second node input and a second node output; and determining, based on the second node input and the second node output, a second subset of nodes, wherein the second subset of nodes performs a third microservice orchestration workflow process.

4. The method of claim 2, further comprising:

in response to transmitting the second network output to the second network node, determining that the second network output corresponds to the requested network process output; and in response to determining that the second network output corresponds to the requested network process output, ending the first microservice orchestration workflow process.

5. The method of claim 2, wherein determining, based on the first node input and the first node output, a first subset of nodes further comprises:

determining a first data lineage requirement for the second microservice orchestration workflow process; and determining the first subset of nodes based on the first data lineage requirement.

6. The method of claim 2, wherein determining, based on the first node input and the first node output, a first subset of nodes further comprises:

determining a first data dependency for the second microservice orchestration workflow process; and determining the first subset of nodes based on the first data dependency.

7. The method of claim 2, wherein determining, based on the first node input and the first node output, a first subset of nodes further comprises:

determining the second microservice orchestration workflow process comprises parallel microservice orchestration workflow processes;

determining the first subset of nodes based on a first parallel microservice orchestration workflow process of the parallel microservice orchestration workflow processes;

determining a second subset of nodes based on a second parallel microservice orchestration workflow process of the parallel microservice orchestration workflow processes; and executing the first parallel microservice orchestration workflow process, using the first subset of nodes, and the second parallel microservice orchestration workflow process, using the second subset of nodes, in parallel.

8. The method of claim 2, wherein determining, based on the first node input and the first node output, a first subset of nodes further comprises:

determining the second microservice orchestration workflow process comprises serial microservice orchestration workflow processes;

determining the first subset of nodes based on a first serial microservice orchestration workflow process of the serial microservice orchestration workflow processes;

determining a second subset of nodes based on a second serial microservice orchestration workflow process of the serial microservice orchestration workflow processes; and executing the first serial microservice orchestration workflow process, using the first subset of nodes, prior to executing the second serial microservice orchestration workflow process, using the second subset of nodes.

9. The method of claim 2, wherein determining, based on the first network node, the first node input and the first node output further comprises:

comparing the first node input to the workflow process input; and determining that the first node input has no dependencies based on comparing the first node input to the workflow process input.

10. The method of claim 9, wherein determining that the first node input has no dependencies based on comparing the first node input to the workflow process input further comprises:

determining to execute the first network node; and executing the first network node.

11. The method of claim 2, wherein determining, based on the first network node, the first node input and the first node output further comprises:

comparing the first node input to the workflow process input;

determining that the first node input has a dependency based on comparing the first node input to the workflow process input; and pausing execution of the first network node based on determining that the first node input has the dependency.

12. The method of claim 11, wherein pausing the execution of the first network node based on determining that the first node input has the dependency further comprises:

determining a third network node corresponding to the dependency;

executing the third network node;

unpausing the execution of the first network node based on executing the third network node;

determining to execute the first network node; and executing the first network node.

13. The method of claim 11, wherein pausing the execution of the first network node based on determining that the first node input has the dependency further comprises:

determining an error code corresponding to the dependency; and generating for display, on a user interface, the error code.

14. The method of claim 2, wherein determining, based on the first network node, the first node input and the first node output further comprises:

determining a current network state; and determining a modification to the first node input or the first node output based on the current network state.

15. The method of claim 2, wherein determining, based on the first network node, the first node input and the first node output further comprises:

retrieving a predefined rule set for dynamic workflow creation; and determining a modification to the first node input or the first node output based on the predefined rule set.

16. The method of claim 2, wherein determining, based on the first network node, the first node input and the first node output further comprises:

retrieving an artificial intelligence model, wherein the artificial intelligence model is trained for dynamic workflow creation based on a first training data set, wherein the first training data set comprises historical requests and historical microservice orchestration workflows; and using the artificial intelligence model to determine the first node input and the first node output.

17. One or more non-transitory, computer-readable media, comprising instructions that, when executed by one or more processors, cause operations comprising:

receiving a first request for initiating a first microservice orchestration workflow process, wherein the first request comprises a workflow process input for the first microservice orchestration workflow process and a requested network process output for the first microservice orchestration workflow process;

determining a first network node of the first microservice orchestration workflow process corresponding to the workflow process input;

determining, based on the first network node, a first node input and a first node output;

determining, based on the first node input and the first node output, a first subset of nodes, wherein the first subset of nodes performs a second microservice orchestration workflow process;

determining a second network output based on the first subset of nodes; and determining, based on the second network output, a second network node of the first microservice orchestration workflow process.

18. The one or more non-transitory, computer-readable media of claim 17, wherein determining, based on the first network node, the first node input and the first node output further comprises:

determining a current network state; and determining a modification to the first node input or the first node output based on the current network state.

19. The one or more non-transitory, computer-readable media of claim 17, wherein determining, based on the first network node, the first node input and the first node output further comprises:

retrieving a predefined rule set for dynamic workflow creation; and determining a modification to the first node input or the first node output based on the predefined rule set.

20. The one or more non-transitory, computer-readable media of claim 17, wherein determining, based on the first network node, the first node input and the first node output further comprises:

retrieving an artificial intelligence model, wherein the artificial intelligence model is trained for dynamic workflow creation based on a first training data set, wherein the first training data set comprises historical requests and historical microservice orchestration workflows; and using the artificial intelligence model to determine the first node input and the first node output.

* * * * *